(12) United States Patent
Lee

(10) Patent No.: US 12,444,205 B2
(45) Date of Patent: Oct. 14, 2025

(54) SYSTEM AND VEHICLE INCLUDING THE SAME

(71) Applicant: HL Klemove Corp., Incheon (KR)

(72) Inventor: Sangju Lee, Uiwang-si (KR)

(73) Assignee: HL Klemove Corp., Incheon (KR)

( * ) Notice: Subject to any disclaimer, the term of this patent is extended or adjusted under 35 U.S.C. 154(b) by 197 days.

(21) Appl. No.: 18/195,031

(22) Filed: May 9, 2023

(65) Prior Publication Data
US 2023/0368543 A1   Nov. 16, 2023

(30) Foreign Application Priority Data
May 12, 2022   (KR) .................. 10-2022-0058121

(51) Int. Cl.
G06V 20/58 (2022.01)
G06V 20/56 (2022.01)
B60T 7/22 (2006.01)

(52) U.S. Cl.
CPC ............ *G06V 20/58* (2022.01); *G06V 20/588* (2022.01); *B60T 7/22* (2013.01); *B60T 2210/20* (2013.01); *B60T 2210/32* (2013.01); *G06V 2201/08* (2022.01)

(58) Field of Classification Search
CPC .. G06V 20/58; G06V 20/588; G06V 2201/08; B60T 7/22; B60T 2210/32; B60T 2210/20; B60W 30/09; B60W 40/076; B60W 40/11; B60W 2050/0005; B60W 2420/403; B60W 2520/16; B60W 2552/15; B60W 2552/50; B60W 2556/45

USPC ........................................................ 701/70
See application file for complete search history.

(56) References Cited

FOREIGN PATENT DOCUMENTS

| | | |
|---|---|---|
| JP | 2013-147114 A | 8/2013 |
| JP | 2020-117066 A | 8/2020 |
| KR | 10-1650266 B1 | 8/2016 |
| KR | 10-2017-0068813 A | 6/2017 |
| KR | 20170125303 A | 11/2017 |
| KR | 20200036069 A | 4/2020 |
| KR | 20220039038 A | 3/2022 |
| WO | WO 2023129648 * 7/2023 ............... G05D 1/04 |

OTHER PUBLICATIONS

Office Action from Korea Patent Office, dated Oct. 17, 2024.

* cited by examiner

*Primary Examiner* — Hai H Huynh
(74) *Attorney, Agent, or Firm* — Harvest IP Law, LLP

(57) ABSTRACT

Disclosed herein are a system for autonomous emergency braking and a vehicle including the same. The system of the present disclosure includes a camera, and a processor configured to identify at least one of other vehicle and a lane line in an image based on image information acquired by the camera, determine whether a gradient of a front road for a vehicle to be entered changes to a reference gradient or more based on at least one of whether the other vehicle is present and whether the lane line is distorted, and control a pre-fill operation based on determining that the gradient of the front road changes to the reference gradient or more.

20 Claims, 10 Drawing Sheets

FLAT ROAD

STEEP GRADIENT (UPHILL ROAD)

STEEP GRADIENT (DOWNHILL ROAD)

SYSTEM AND VEHICLE INCLUDING THE SAME

CROSS-REFERENCE TO RELATED APPLICATION

This application claims the benefit of Korean Patent Application No. 10-2022-0058121, filed on May 12, 2022 in the Korean Intellectual Property Office, the disclosure of which is incorporated herein by reference.

BACKGROUND

1. Field

Embodiments of the present disclosure relate to a system for preventing a collision with an obstacle, and a vehicle including the same.

2. Description of the Related Art

Recently, in order to transmit traveling information of a vehicle to a driver to prevent an accident from occurring due to the driver's carelessness and perform autonomous driving for the driver's convenience, various types of advanced driver assistance systems (ADASs) have been developed.

As an example of an ADAS, there is a technology for detecting a distance to an obstacle near a vehicle using a distance sensor installed in the vehicle and warning a driver of the presence of the obstacle when the detected distance to the obstacle is shorter than or equal to a reference distance.

As another example of an ADAS, there is a technology for determining a risk of collision with an obstacle near a vehicle and notifying a driver of the determined risk of collision.

As still another example of an ADAS, there is an autonomous driving technology for performing autonomous driving to a destination based on road information and current position information and performing autonomous driving to the destination while avoiding obstacles based on a risk of collision with nearby obstacles.

In existing ADASs, when a current speed and acceleration of a vehicle are assumed to be maintained, a time-to-collision (TTC), which is a time until collision between the vehicle and an obstacle, is predicted based on the current speed and acceleration of the vehicle and a distance to the obstacle, and a risk of collision with the obstacle is determined based on the predicted TTC.

In such existing ADASs, there is a problem that performance for identifying a front obstacle (that is, the other vehicle) is lowered when a gradient of a road on which a vehicle travels changes. Accordingly, there is a problem that the performance of an autonomous emergency braking (AEB) function among functions of existing ADASs is degraded, and thus response performance to respond to a risk of collision is also degraded.

SUMMARY

Therefore, it is an aspect of the present disclosure to provide a driver assistance system for determining a change in gradient of a road based on at least one of camera image information and traveling state information and controlling a pre-fill operation of an autonomous emergency braking device according to the change in gradient of the road, and a vehicle including the same.

Additional aspects of the disclosure will be set forth in part in the description which follows and, in part, will be obvious from the description, or may be learned by practice of the disclosure.

In accordance with one aspect of the present disclosure, a system includes a camera, and a processor configured to identify at least one of other vehicle and a lane line in an image based on image information acquired by the camera, determine whether a gradient of a front road for a vehicle to be entered changes to a reference gradient or more based on at least one of whether the other vehicle is present and whether the lane line is distorted, and control a pre-fill operation based on determining that the gradient of the front road changes to the reference gradient or more.

The system may further include an obstacle detector configured to detect an obstacle and output obstacle information about the detected obstacle. The processor may obtain a time-to-collision with respect to the other vehicle based on the obstacle information upon determining that the gradient of the front road changes less than the reference gradient, and may control the pre-fill operation based on the obtained time-to-collision.

The system may further include a communicator. The processor may determine whether the gradient of the front road changes to the reference gradient or more based on pitch angle information of a vehicle body received through the communicator.

The processor may determine a distortion of the lane line based on identifying the lane line in the image, and determine that the gradient of the front road changes to the reference gradient or more based on determining a distortion of the lane line being greater than or equal to a reference distortion.

The processor may secondly determine whether the other vehicle is present based on other image information acquired after a preset time elapses based on determining that the other vehicle is present in the image, and determine that the gradient of the front road changes to the reference gradient or more based on determining that no other vehicle is not present in the image.

The system may further include an obstacle detector configured to detect an obstacle and output obstacle information about the detected obstacle. The processor may determine that the gradient of the front road changes less than the reference gradient based on determining that the other vehicle is present on other image information acquired after a preset time elapses, may obtain a time-to-collision with respect to the other vehicle based on the obstacle information, and may control the pre-fill operation based on the obtained time-to-collision.

The system may further include an obstacle detector configured to detect an obstacle and output obstacle information about the detected obstacle. The processor may determine whether the other vehicle is detected by the obstacle detector, determine whether the other vehicle is present in the image based on determining that the other vehicle is detected by the obstacle detector, and determine that the gradient of the front road changes to the reference gradient or more based on determining that the other vehicle is not present in the image.

The processor may obtain a time-to-collision with respect to the other vehicle based on the obstacle information upon determining that the other vehicle is detected by the obstacle detector and the other vehicle is present in the image, and may control the pre-fill operation based on the obtained time-to-collision.

In accordance with another aspect of the present disclosure, a system includes a communicator, a camera, and a processor configured to determine whether the other vehicle is present in an image based on image information acquired by the camera, determine whether a gradient of a front road changes to a reference gradient or more based on pitch angle information of a vehicle body received through the communicator upon determining whether the other vehicle is present in the image, and control a pre-fill operation based on determining that the gradient of the front road changes to the reference gradient or more.

The system may further include an obstacle detector configured to detect an obstacle and output obstacle information about the detected obstacle. The processor may obtain a time-to-collision with respect to the other vehicle based on the obstacle information upon determining that the gradient of the front road changes less than the reference gradient, and may control the pre-fill operation based on the obtained time-to-collision.

The processor may determine that the gradient of the front road changes to the reference gradient or more based on determining that a pitch angle of the vehicle body changes to a reference pitch angle or more based on the pitch angle information of the vehicle body and there is a change from a state in which the other vehicle is present to a state in which the other vehicle is not present in two images acquired with a preset time interval.

The system may further include an obstacle detector configured to detect an obstacle and output obstacle information about the detected obstacle. The processor may determine that the gradient of the front road changes less than the reference gradient based on determining that the pitch angle of the vehicle body is less than the reference pitch angle or the other vehicle is present in the two images, the processor, may obtain a time-to-collision with respect to the other vehicle based on the obstacle information, and may control the pre-fill operation based on the obtained time-to-collision.

The system may further include an obstacle detector configured to detect an obstacle and output obstacle information about the detected obstacle. The processor may obtain a time-to-collision with respect to the other vehicle based on the obstacle detection information after a vehicle enters the front road and may control the pre-fill operation to be released based on the obtained time-to-collision.

In still accordance with another aspect of the present disclosure, a vehicle includes an obstacle detector configured to detect an obstacle and output obstacle information about the detected obstacle, a pitch angle detector configured to detect a pitch angle of a vehicle body, a camera, and a processor configured to determine whether the other vehicle is present in an image based on image information acquired by the camera, determine whether a gradient of a front road changes to a reference gradient or more based on the obstacle information and pitch angle information of the vehicle body upon determining that the other vehicle is present in the image, and control a pre-fill operation based on determining that the gradient of the front road changes to the reference gradient or more.

The processor may obtain a time-to-collision with respect to the other vehicle based on the obstacle information upon determining that the gradient of the front road changes less than the reference gradient, and may control the pre-fill operation based on the obtained time-to-collision.

The processor may determine that the gradient of the front road changes to the reference gradient or more based on determining that the pitch angle of the vehicle body changes to a reference pitch angle or more based on the pitch angle information of the vehicle body and there is a change from a state in which the other vehicle is present to a state in which the other vehicle is not present in two images acquired with a preset time interval.

The processor may determine that the gradient of the front road changes less than the reference gradient based on determining that the pitch angle of the vehicle body is less than the reference pitch angle or the other vehicle is present in the two images, may obtain a time-to-collision with respect to the other vehicle based on the obstacle information, and may control the pre-fill operation based on the obtained time-to-collision.

The processor may obtain a time-to-collision with respect to the other vehicle based on obstacle detection information after a vehicle enters the front road and may control the pre-fill operation to be released based on the obtained time-to-collision.

The processor may determine a distortion of the lane line based on a lane line being identified in the image, and determine that the gradient of the front road changes to the reference gradient or more based on determining a distortion of the lane line being greater than or equal to a reference distortion.

The processor may determine that the gradient of the front road changes to the reference gradient or more based on determining that the other vehicle is detected by the obstacle detector and the other vehicle is not present in the image.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
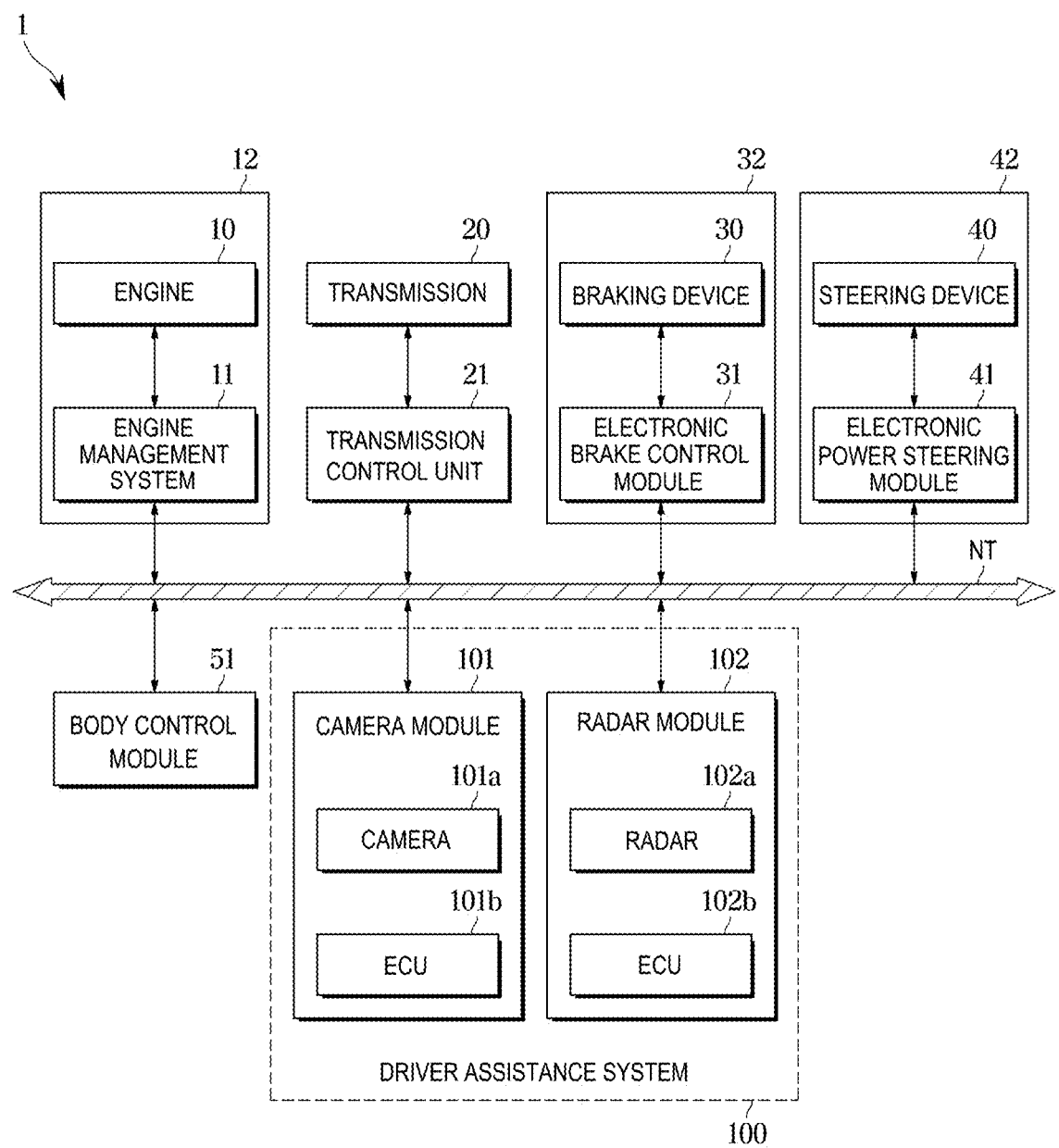
FIG. 1 is a block diagram of a vehicle according to an embodiment.

Like reference numerals refer to like elements throughout the specification. Not all elements of embodiments of the present disclosure will be described, and the description of elements commonly known in the art or that overlap each other in the embodiments will be omitted.

Terms as used throughout the specification such as "part," "module," "member," and "block" may be implemented in software and/or hardware, and a plurality of "parts," "modules," "members," or "blocks" may be implemented in a single element, or a single "part," "module," "member," or "block" may include a plurality of elements.

It will be understood that when an element is referred to as being "connected" to another element, it can be directly or indirectly connected to the other element, wherein the indirect connection includes "connection via a wireless communication network."

When a part "includes" or "comprises" an element, unless there is a particular description to the contrary, the part may further include other elements, rather than such other elements being excluded.

Throughout the present specification, the term "on" that is used to designate a position of one element with respect to another element includes both a case where the one element is adjacent to another element and a case where there is still another element between the two elements.

The terms "first," "second," and the like are used to differentiate a certain element from another element, but elements should not be construed to be limited by the terms.

A singular expression includes a plural expression unless the context clearly indicates otherwise.

An identification code is used for convenience of the description but is not intended to illustrate the order of operations. The operations may be implemented in an order different from the illustrated order unless the context clearly indicates otherwise.

The principle and embodiments of the present disclosure will now be described with reference to the accompanying drawings.

FIG. 1 is a block diagram of a vehicle according to an embodiment.

The vehicle according to the embodiment may be an internal combustion engine vehicle or an eco-friendly vehicle.

In the present embodiment, an example of the internal combustion engine vehicle will be described.

As shown in FIG. 1, a vehicle 1 includes an engine 10, a transmission 20, a braking device 30, and a steering device 40.

The engine 10 may include a cylinder and a piston and may generate power for driving the vehicle 1.

The transmission 20 may include a plurality of gears and may transmit power generated by the engine 10 to wheels.

The braking device 30 may decelerate or stop the vehicle 1 through friction with the wheels.

The steering device 40 may change a traveling direction of the vehicle 1.

The vehicle 1 may include a plurality of electronic components.

For example, the vehicle 1 further includes an engine management system (EMS) 11, a transmission control unit (TCU) 21, an electronic brake control module 31, an electronic power steering (EPS) device 41, a body control module (BCM), and a driver assistance system (DAS).

The EMS 11 may control the engine 10 in response to an acceleration intention of a driver conveyed through an accelerator pedal or a request from a DAS 100. For example, the EMS 11 may control torque of the engine 10.

The TCU 21 may control the transmission 20 in response to a shift command of a driver through a shift lever (also referred to as a gear lever, a shifting lever, or a gear shift) and/or a traveling speed of the vehicle 1. For example, the TCU 21 may adjust a transmission ratio from the engine 10 to the wheels.

The electronic brake control module 31 may control the braking device 30 in response to a breaking intention of a driver conveyed through a brake pedal and/or slip of the wheels. For example, the electronic brake control module 31 may temporarily release braking of the wheel in response to slip of the wheel detected during braking of the vehicle 1 (anti-lock braking system (ABS)).

The electronic brake control module 31 may selectively release braking of the wheel in response to oversteering and/or understeering detected during steering of the vehicle 1 (electronic stability control (ESC)).

In addition, the electronic brake control module 31 may temporarily brake the wheel in response to slip of the wheel detected during driving of the vehicle 1 (traction control system (TCS)).

The EPS device 41 may assist the operation of the steering device 40 in response to a steering intention of a driver through a steering wheel such that the driver may easily operate the steering wheel. For example, the EPS device 41 may assist the operation of the steering device 40 to reduce a steering force during low-speed traveling or parking and may increase a steering force during high-speed traveling.

A BCM 51 may control the operation of the electronic components which provide convenience to a driver or ensure the safety of the driver. For example, the BCM 51 may control head lamps, wipers, clusters, multi-function switches, and direction-indicating lamps.

The DAS 100 may assist the driver in operating (driving, braking, and steering) the vehicle 1. For example, the DAS 100 may detect an environment around the vehicle 1 (for example, other vehicles, pedestrians, cyclists, lane lines, road signs, traffic lights, etc.) and may control driving and/or braking and/or steering of the vehicle 1 based on the detected environment.

The DAS 100 may perform a manual driving mode in which driving of the vehicle is performed in response to a driving intention of a user and may perform a function of warning of a risk of collision with an obstacle during the manual driving mode.

The DAS 100 may provide various functions to a driver. For example, the DAS 100 may provide a lane departure warning (LDW), lane keeping assist (LKA), high beam assist (HBA), autonomous emergency braking (AEB), traffic sign recognition (TSR), smart cruise control (SCC), blind spot detection (BSD), and the like.

The DAS 100 may perform an autonomous driving mode of allowing the vehicle itself to identify a road environment, determine obstacles and traveling conditions, and avoid the obstacles, and controlling traveling of the vehicle according to a planned traveling path to allow the vehicle to travel to a destination.

The DAS 100 includes a camera module 101 which acquires image data around the vehicle 1 and a radar module 102 which acquires obstacle data around the vehicle 1.

The camera module 101 may include a camera 101a and a controller (electronic control unit (ECU)) 101b and may photograph a view near the vehicle 1 and identify other vehicles, pedestrians, cyclists, lane lines, road signs, traffic lights, etc.

The radar module 102 may include a radar 102a and a controller 102b and may acquire relative positions, relative speeds, or the like of obstacles (for example, other vehicles, pedestrians, cyclists, or the like) near the vehicle 1.

The above electronic components may communicate with each other through a vehicle communication network NT. For example, the electronic components may transmit and receive data through Ethernet, Media Oriented Systems Transport (MOST), FlexRay, a controller area network (CAN), or a local interconnect network (LIN).

The DAS 100 may transmit a driving control signal, a braking signal, and a steering signal to the EMS 11, the electronic brake control module 31, and the EPS device 41 through the vehicle communication network NT, respectively.

Figure 2:
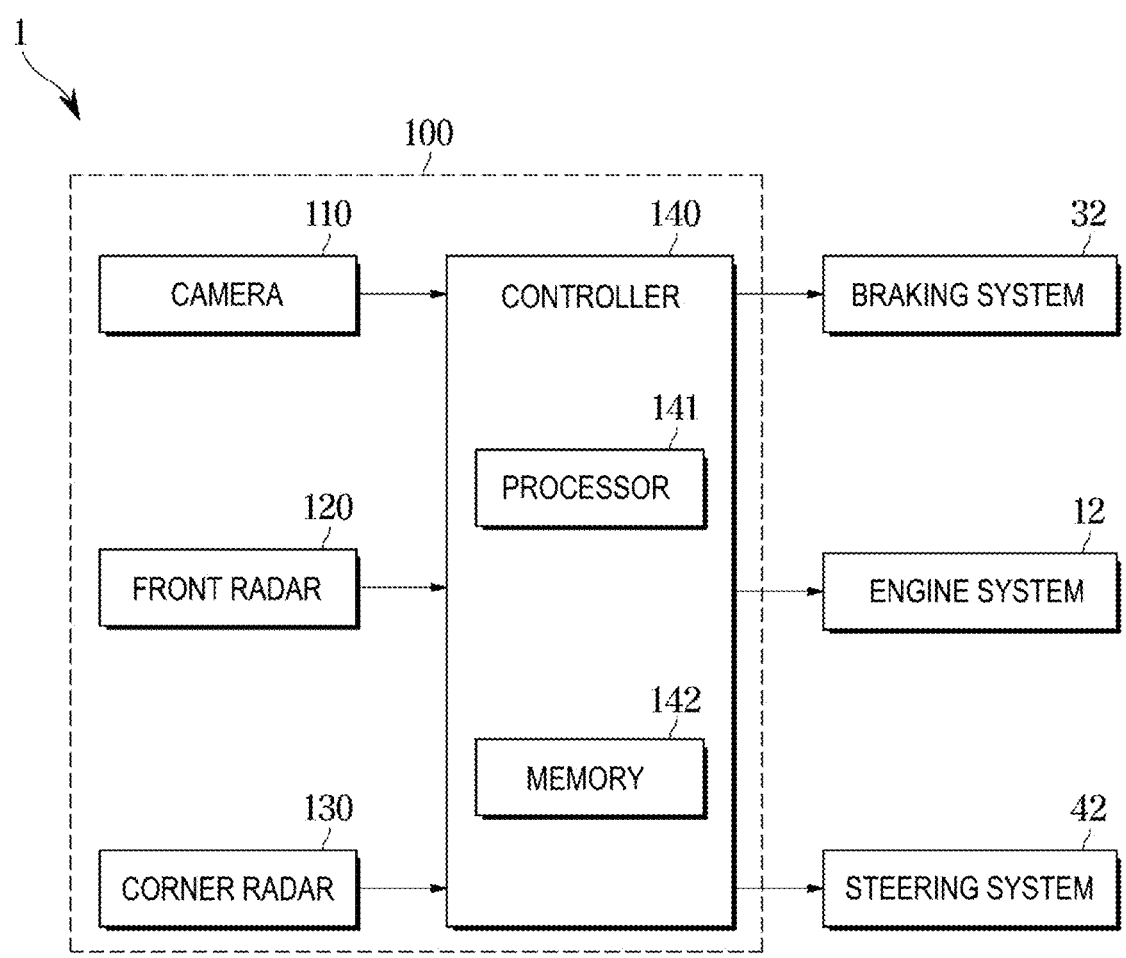
FIG. 2 is a block diagram of a driver assistance system provided in a vehicle according to an embodiment.
Figure 3:
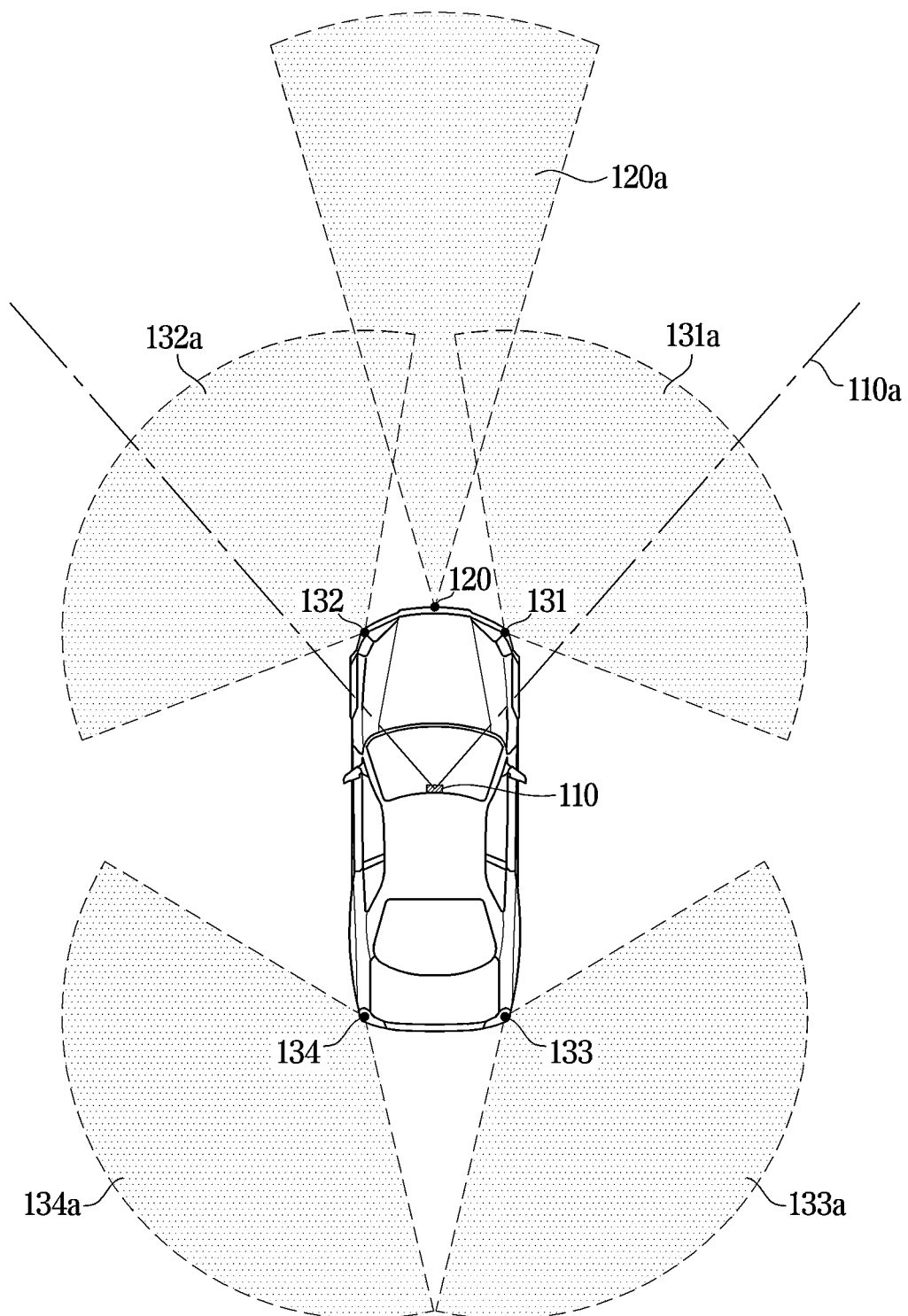
FIG. 3 is an exemplary diagram of detection areas of a camera and a radar included in a driver assistance system of a vehicle according to an embodiment.

FIG. 2 is a block diagram of a DAS provided in a vehicle according to an embodiment. FIG. 3 is an exemplary diagram of detection areas of a camera and a radar included in a DAS of a vehicle according to an embodiment.

As shown in FIG. 2, a vehicle 1 may include a braking system 32, an engine system 12, a steering system 42, and a DAS 100.

The engine system 12 may include the EMS 11 and the engine 10 described with reference to FIG. 1. The braking system 32 may include the electronic brake control module 31 (see FIG. 1) and the braking device 30 (see FIG. 1) described with reference to FIG. 1. The steering system 42 may include the EPS device 41 (see FIG. 1) and the steering device 40 (see FIG. 1).

The DAS 100 of the present embodiment may include a front camera 110 as a camera of a camera module 101 and may include a front radar 120 and a plurality of corner radars 130 (131, 132, 133, and 134) as radars of a radar module 102.

As shown in FIG. 3, the DAS 100 may include the front camera 110, the front radar 120, and the plurality of corner radars 130 to secure a forward field of view 110*a* of the vehicle 1.

The front camera 110 may be installed, for example, on a front windshield of the vehicle 1.

The front camera 110 may photograph a view in front of the vehicle 1 and may acquire image data of the view in front of the vehicle 1. The image data of the view in front of the vehicle 1 may include position information about at least one of other vehicles, pedestrians, cyclists, lane lines, curbs, guardrails, street trees, and streetlights in front of the vehicle 1.

The front camera 110 may include a plurality of lenses and an image sensor. The image sensor may include a plurality of photodiodes that convert light into an electrical signal, and the plurality of photodiodes may be disposed in the form of a two-dimensional matrix.

The front camera 110 may be electrically connected to a controller 140. For example, the front camera 110 may be connected to the controller 140 through a vehicle communication network NT, may be connected to the controller 140 through a hard wire, or may be connected to the controller 140 through a printed circuit board (PCB).

The front camera 110 may transfer the image data of the view in front of the vehicle 1 to the controller 140.

The front radar 120 may have a forward field of sensing 120*a* of the vehicle 1. The front radar 120 may be installed, for example, on a grill or bumper of the vehicle 1.

The front radar 120 may include a transmitting antenna (or a transmitting antenna array) for radiating transmission radio waves forward from the vehicle 1, and a receiving antenna (or a receiving antenna array) for receiving reflected radio waves reflected from an obstacle.

The front radar 120 may acquire front radar data from transmission waves transmitted by the transmitting antenna and reflected waves received by the receiving antenna.

The front radar data may include position information and speed information related to other vehicles, pedestrians, or cyclists in front of the vehicle 1.

The front radar 120 may calculate a relative distance to an obstacle based on a phase difference (or time difference) between transmission radio waves and reflected radio waves and may calculate a relative speed of the obstacle based on a frequency difference between the transmission radio waves and the reflected radio waves.

The front radar 120 may be connected to the controller 140 through, for example, the vehicle communication network NT, a hard wire, or a PCB. The front radar 120 may transfer the front radar data to the controller 140.

The plurality of corner radars 130 include a first corner radar 131 installed at a front right side of the vehicle 1, a second corner radar 132 installed at a front left side of the vehicle 1, a third corner radar 133 installed at a rear right side of the vehicle 1, and a fourth corner radar 134 installed at a rear left side of the vehicle 1.

The first corner radar 131 may have a field of sensing 131*a* in a front-right direction of the vehicle 1. The first corner radar 131 may be installed at a right side of a front bumper of the vehicle 1.

The second corner radar 132 may have a field of sensing 132*a* in a front-left direction of the vehicle 1 and may be installed at a left side of the front bumper of the vehicle 1.

The third corner radar 133 may have a field of sensing 133*a* in a rear-right direction of the vehicle 1 and may be installed at a right side of a rear bumper of the vehicle 1.

The fourth corner radar 134 may have a field of sensing 134*a* in a rear-left direction of the vehicle 1 and may be installed at a left side of the rear bumper of the vehicle 1.

Each of the first, second, third, and fourth corner radars 131, 132, 133, and 134 may include a transmitting antenna and a receiving antenna.

The first, second, third, and fourth corner radars 131, 132, 133, and 134 may acquire first corner radar data, second corner radar data, third corner radar data, and fourth corner radar data, respectively.

The first corner radar data may include distance information and speed information related to other vehicles, pedestrians, or cyclists (hereinafter referred to as "obstacles") in the front-right direction of the vehicle 1.

The second corner radar data may include distance information and speed information related to obstacles in the front-left direction of the vehicle 1.

The third corner radar data and the fourth corner radar data may include distance information and speed information of obstacles in the rear-right direction of the vehicle 1 and the rear-left direction of the vehicle 1.

Each of the first, second, third, and fourth corner radars 131, 132, 133, and 134 may be connected to the controller 140 through the vehicle communication network NT, a hard wire, or a PCB. The first, second, third, and fourth corner radars 131, 132, 133, and 134 may transmit the first corner radar data, the second corner radar data, the third corner radar data, and the fourth corner radar data to the controller 140, respectively.

The controller 140 may include a controller 101*b* (see FIG. 1) of a camera module 101 (see FIG. 1), a controller 102*b* (see FIG. 1) of a radar module 102 (see FIG. 1), and/or a separate integrated controller.

The controller 140 may include a processor 141 and a memory 142.

The processor 141 may process front image data of the front camera 110, front radar data of the front radar 120, and corner radar data of the plurality of corner radars 130 and may generate an acceleration signal, a braking signal, and a steering signal for controlling the engine system 12, the braking system 32, and the steering system 42.

For example, the processor 141 may include an image signal processor which processes front image data of the front camera 110, a digital signal processor which processes radar data of the radars 120 and 130, and/or a micro control unit (MCU) which generates a driving signal and a steering signal.

The processor 141 may detect obstacles (for example, other vehicles, pedestrians, cyclists, curbs, guardrails, street trees, street lights, etc.) in front of the vehicle 1 based on the front image data of the front camera 110 and the front radar data of the front radar 120.

Specifically, the processor 141 may acquire position information (distance and direction) and speed information (relative speed) of obstacles in front of the vehicle 1 based on the front radar data of the front radar 120. Based on the front image data of the front camera 110, the processor 141 may acquire position information (direction) and type information of an obstacle in front of the vehicle 1 (for example, whether the obstacle is the other vehicle, a pedestrian, a cyclist, a curb, a guardrail, a street tree, or a street light, etc.).

In addition, the processor 141 may match obstacles detected based on the front image data with obstacles detected based on the front radar data and may acquire type information, position information, and speed information of obstacles in front of the vehicle 1 based on matching results.

During an autonomous driving mode, the processor 141 may generate an acceleration signal, a braking signal, and a steering signal based on type information, position information, and speed information of front obstacles and may allow the vehicle to autonomously travel to a destination based on the generated acceleration signal, braking signal, and steering signal.

For example, the processor 141 may calculate a time to collision (TTC), which is a time until collision between the vehicle 1 and a front obstacle, based on position information (relative distance) and speed information (relative speed) of the front obstacle and may warn a driver of a risk of the collision, transmit a braking signal to the braking system 32, or transmit a steering signal to the steering system 42 based on a comparison result between the calculated TTC and a preset reference time.

The processor 141 may transmit a steering signal to the steering system 42 based on direction information among position information of the front obstacle.

As another example, the processor 141 may calculate a distance to collision (DTC), which is a distance until collision between the vehicle and a front obstacle, based on speed information (that is, a relative speed) of the front obstacle and may warn a driver of the collision or transmit a braking signal to the braking system 32 based on a comparison result between the calculated DTC and a distance to the front obstacle.

The processor 141 may acquire position information (distance and direction) and speed information (relative speed) of obstacles at sides (front right side, front left side, rear right side, and rear left side) of the vehicle 1 based on corner radar data of the plurality of corner radars 130.

The memory 142 may store programs and/or data for processing image data by the processor 141, programs and/or data for processing radar data by the processor 141, and programs and/or data for generating a braking signal and/or a steering signal by the processor 141.

The memory 142 may temporarily store image data received from the front camera 110 and/or radar data received from the radars 120 and 130 and may temporarily store processing results of image data and/or radar data by the processor 141.

The memory 142 may include not only volatile memories such as a static random access memory (SRAM) and a dynamic random access memory (DRAM) but also non-volatile memories such as a flash memory, a read only memory (ROM), and an erasable programmable ROM (EPROM), and the like.

A specific control configuration of a vehicle provided with a DAS performing AEB will be described with reference to FIG. 4.

Figure 4:
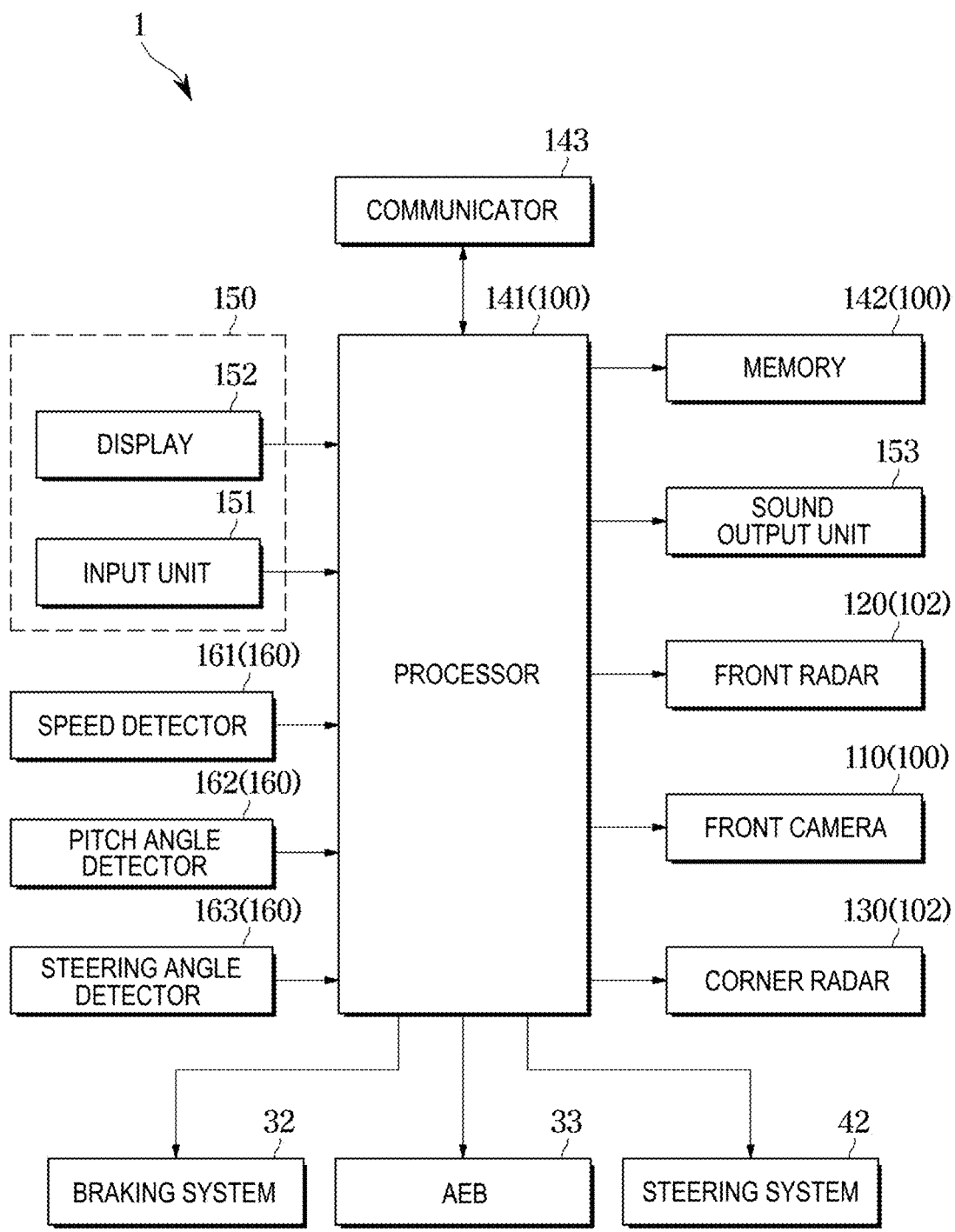
FIG. 4 is a detailed control block diagram of a vehicle equipped with a driver assistance system according to an embodiment.

FIG. 4 is a detailed control block diagram of a vehicle provided with a DAS according to an embodiment. Descriptions will be provided with reference to FIGS. 5A, 5B, 6A, 6B, 7A, 7B, 8A, 8B, 9A, 9B, 9C, and 10.

A vehicle 1 may include an AEB device 33, a DAS 100, a user interface 150, and a traveling information detector 160.

The AEB device 33 is a device which determines a possibility of collision with a front obstacle, and when it is determined that there is the possibility of collision with the front obstacle, the AEB device 33 controls the output of warning information or outputs a deceleration signal and a braking signal to a braking device 30.

An AEB function of the AEB device 33 may be one function performed by the DAS 100.

The AEB device 33 may be provided as an ECU.

In addition to the components shown in FIG. 2, the DAS 100 may further include a communicator 143.

The communicator 143 may communicate with various electronic devices in the DAS 100 and may also communicate with various electronic devices in the vehicle 1.

The communicator 143 may include one or more components for establishing communication with an external device and may include, for example, at least one of a short-distance communication module, a wired communication module, and a wireless communication module.

The short-range communication module may include various short-range communication modules such as a Bluetooth module, an infrared communication module, a radio frequency identification (RFID) communication module, a wireless local access network (WLAN) communication module, a near field communication (NFC) module, and a ZigBee communication module which transmit and receive signals using a wireless communication network at a short distance.

The wired communication module may include various wired communication modules such as a controller area network (CAN) communication module, a local area network (LAN) module, a wide area network (WAN) module, and a value added network (VAN) module as well as various cable communication modules such as a Universal Serial Bus (USB), a High Definition Multimedia Interface (HDMI), a Digital Visual Interface (DVI), Recommended Standard 232 (RS-232), power line communication, and a plain old telephone service (POTS).

In addition to a WiFi module and a WiBro module, the wireless communication module may include wireless communication modules which support various wireless communication methods such as Global System for Mobile Communications (GSM), code division multiple access (CDMA), wideband code division multiple access (WCDMA), Universal Mobile Telecommunications System (UMTS), time division multiple access (TDMA), and Long Term Evolution (LTE).

The communicator 143 may allow communication to be performed between the DAS 100 and a communicator provided in the vehicle 1 (that is, a communication network NT).

The communicator 143 may further include a position receiver (not shown).

The position receiver receives position information corresponding to a current position of the vehicle which is traveling or stopping.

The position receiver may include a Global Positioning System (GPS) receiver. Here, the GPS receiver includes an antenna module for receiving signals from a plurality of GPS satellites and a signal processor.

The signal processor includes software for obtaining a current position using a distance and time information corresponding to position signals of the plurality of GPS satellites and a transmitter for transmitting acquired position information of the vehicle.

The communicator 143 may establish communication (V2I communication) between the vehicle 1 and an infrastructure (not shown) and may establish communication (V2V communication) with the other vehicle.

A front camera 110, a front radar 120, and a corner radar 130 may be components provided in the DAS 100.

The front camera 110, the front radar 120, and the corner radar 130 may also be components provided in the vehicle 1 to transmit or receive information to or from the DAS 100 through communication.

The front camera 110 detects a road and object information around the vehicle 1 and converts the detected road and object information into an electrical image signal, detects an environment outside the vehicle, particularly a road on which the vehicle is traveling, and object information in front of the vehicle at a current position of the vehicle, and transmits an image signal of the detected road and object information to the processor 14. Here, the image signal may be an image signal for a road in a forward direction based on a traveling direction of the vehicle and an image signal for roads at both sides of the road in the forward direction.

The front camera 110 may be a camera provided in a camera module 101 and may include a charge coupled device (CCD) or a complementary metal-oxide semiconductor (CMOS) image sensor.

A radar module 102 may include the front radar 120 and the corner radar 130 which detect front and left/right side obstacles and transmit obstacle information about the detected obstacles to a processor 141. Here, the obstacle information may include position information of an obstacle, and the position information of the obstacle may include distance information about a distance to the object and direction information of the obstacle. The distance information about the distance to the obstacle may be distance information about a relative distance to the obstacle.

The front radar 120 and the corner radar 130 may be obstacle detectors for detecting obstacles. The front radar 120 and the corner radar 130 have been described with reference to FIG. 3, and thus descriptions thereof are omitted.

In addition to the front radar 120 and the corner radar 130, the vehicle 1 may further include at least one of a light detection and ranging (LiDAR) sensor and an ultrasonic sensor and may further include at least one camera as obstacle detectors.

The LiDAR sensor is a non-contact distance detection sensor using a principle of a laser radar. The LiDAR sensor may include a transmitter for transmitting a laser beam and a receiver for receiving a laser beam that is returned by being reflected from a surface of an object within a sensor range.

The ultrasonic sensor generates ultrasonic waves for a certain time and then detects a signal that is reflected and returned from an object. The ultrasonic sensor may be used to determine the presence or absence of an obstacle such as a pedestrian within a short range.

The user interface 150 may include an input unit 151 for receiving a user input and a display 152 for displaying various types of information.

The user interface 150 may be a vehicle terminal (audio video navigation (AVN) device) which performs at least one of a radio function, an audio function, a video function, a map display function, a navigation function, a digital multimedia broadcasting (DMB) function, a content playback function, and an Internet search function.

The input unit 151 may receive an on command and an off command for an AEB mode

The AEB mode is a mode of providing a notification of a possibility of collision with an obstacle and allowing emergency braking to be automatically performed.

The input unit 151 may receive a command for turning an autonomous driving mode on and a command for turning the autonomous driving mode off and may transmit signals corresponding to the received commands to the processor 141.

The input unit 151 may receive an operation command for any one function among functions that may be performed in the vehicle 1. For example, the input unit 151 may receive a command for operating at least one of the radio function, the audio function, the video function, the map display function, the navigation function, the DMB function, the content playback function, and the Internet search function.

The input unit 151 may also receive a target traveling speed for performing the autonomous driving mode.

The input unit 151 may be provided in a head unit or center fascia of the vehicle 1 or may be provided in the vehicle terminal 150. The input unit 151 may be provided as a button, a key, a switch, an operation lever, a jog dial, or the like or may be provided as a touch pad.

The display 152 displays operation information about a function that is being performed in the vehicle 1 or the user interface 150. For example, the display 152 may display information related to a phone call, may display content information output through the user interface 150, may display information related to music playback, or may also display external broadcasting information.

During a navigation mode, the display 152 may display map information, and may display map information and road guidance information matched with a path to a destination.

The display 152 may display an image of a road or may display position information of a pedestrian and position information of the other vehicle.

The display 152 may also display traveling information about a target traveling speed and an actual traveling speed in the autonomous driving mode.

The display 152 may display collision warning information for providing a notification regarding a collision with an obstacle as an image.

The display 152 may also display acceleration information, deceleration information, and steering information for avoiding an obstacle as images.

The display 152 may display on/off information about the AEB mode.

The display 152 may also display warning information according to execution of the AEB mode. Here, the warning information may include first stage warning information, second stage warning information, and third stage warning information.

Here, the first stage warning information may be information output at a pre-fill time point, the second stage warning information may be information output at a partial braking time point, and the third stage warning information may be information output at a full braking time point.

The display 152 may display emoticons having different colors or emoticons having different shapes for each stage of the warning information.

The display 152 may be a lamp such as a light-emitting diode (LED) or a flat display device such as a liquid crystal display (LCD).

When the input unit 151 includes a touch panel, the display 152 may be provided as a flat or curved touch screen provided integrally with the touch panel.

The user interface 150 may further include a sound output unit 153.

In response to a control command of the processor 141, the sound output unit 153 may output operation information and guidance information about functions being performed in the vehicle 1 or the user interface 150 as sounds. For example, when the navigation mode is performed, the sound output unit 153 may output a sound for road guidance in response to a control command of the processor 141.

The sound output unit 153 may output warning information as a sound so as to provide a notification of a risk of collision with an obstacle.

The sound output unit 153 may output the first stage warning information, the second stage warning information, and the third stage warning information as sounds. The sound output unit 153 may output a sound at a level corresponding to a control command of the processor 141.

The sound output unit 153 may output sounds of different sound types, different sound volume levels, or different sound output periods for each stage of the warning information.

Here, a volume level of a sound corresponding to the first stage warning information may be lower than a volume level of a sound corresponding to the second stage warning information, and the volume level of the sound corresponding to the second stage warning information may be lower than a volume level of a sound corresponding to the third stage warning information.

That is, the volume level of the sound corresponding to the first stage warning information may be the lowest, and the volume level of the sound corresponding to the third stage warning information may be the highest.

In addition, an output period of the sound corresponding to the first stage warning information may be longer than an output period of the sound corresponding to the second stage warning information, and the output period of the sound corresponding to the second stage warning information may be longer than an output period of the sound corresponding to the third stage warning information.

That is, the output period of the sound corresponding to the first stage warning information may be the longest, and the output period of the sound corresponding to the third stage warning information may be the shortest.

The sound output unit 153 may be provided as one or more speakers.

The vehicle 1 may include a traveling information detector 160 which detects traveling information about a traveling state of the vehicle such as a traveling speed, a traveling direction, an acceleration, decelerating, accelerating, and a pitch angle of a vehicle body.

The traveling information detector 160 may include a speed detector 161, a pitch angle detector 162, and a steering angle detector 163.

The speed detector 161 detects a traveling speed of the vehicle and outputs traveling speed information about the detected traveling speed.

The speed detector 161 may include a plurality of wheel speed sensors. The speed detector 161 may include an acceleration sensor. The speed detector 161 may include the plurality of wheel speed sensors and the acceleration sensor.

When the speed detector 161 includes the acceleration sensor, the processor 141 may obtain an acceleration of the vehicle 1 based on information detected by the acceleration sensor and may also obtain a traveling speed of the vehicle 1 based on the obtained acceleration.

When the speed detector 161 includes the acceleration sensor and the plurality of wheel speed sensors, the processor 141 may obtain an acceleration of the vehicle 1 based on information detected by the acceleration sensor and may also obtain a traveling speed of the vehicle 1 based on speed information acquired by the plurality of wheel speed sensors.

The pitch angle detector 162 detects a pitch angle of the vehicle body and outputs pitch angle information about the detected pitch angle.

The pitch angle detector 162 may include a sensor for detecting a pitch angle of the vehicle body. For example, the pitch angle detector 162 may include at least one of an acceleration sensor, a gyro sensor, an angular speed sensor, a geomagnetic sensor, and a gravity sensor.

Here, the pitch angle of the vehicle body may correspond to a gradient of a road.

The steering angle detector 163 detects a traveling direction of the vehicle and outputs traveling direction information about the detected traveling direction.

The steering angle detector 163 may detect a steering angle corresponding to an operation of a steering wheel.

The processor 141 may control execution of the autonomous driving mode in response to a command for turning the autonomous driving mode on.

During the autonomous driving mode, the processor 141 may check destination information input by the input unit 151, may check current position information received by the position receiver, may set the checked current position information as departure point information, may search for a path from a departure point to a destination based on the departure point information and the destination information, may acquire road guidance information for a path that it finds, and may control the display 152 to display navigation information, with which map information, the departure point information, the destination information, path information, and the road guidance information are matched, as an image.

During the autonomous driving mode, the processor 141 may control traveling based on the navigation information, and based on acquired traveling speed information and target traveling speed information, the processor 141 may control a speed of the vehicle such that the vehicle travels at a target traveling speed. Here, the target traveling speed information may be preset traveling speed information or may be target traveling speed information input by a user.

Acquiring traveling speed information of the vehicle may include acquiring the traveling speed information of the vehicle based on detection information output from the plurality of wheel speed sensors.

Acquiring traveling speed information of the vehicle may include acquiring acceleration information based on detection information output from the acceleration sensor and acquiring the traveling speed information of the vehicle based on the acquired acceleration information.

Acquiring traveling speed information of the vehicle may include acquiring the traveling speed information of the vehicle based on detection information output from the plurality of wheel speed sensors and detection information output from the acceleration sensor.

The processor 141 may identify obstacles in front of and beside the vehicle 1 based on image information of the front camera 110, front radar information of the front radar 120, and corner radar information of the corner radar 130 and may obtain speed information, position information, and type information of the identified obstacles.

The position information of the obstacles may include relative distance information and relative direction information with respect to the vehicle 1, and the speed information may include relative speed information.

The processor 141 may predict movement of obstacles near the vehicle 1 based on the speed information, the position information, and the type information of the identified obstacles.

Nearby obstacles include the other vehicle traveling in the same lane as the vehicle 1 and traveling in front of the vehicle 1, the other vehicle traveling in a lane to the left of the vehicle 1, and the other vehicle traveling in a lane to the right of the vehicle 1.

Nearby obstacles may be vehicles of which a relative distance to the vehicle 1 is less than or equal to a reference distance and of which a relative speed with respect to the vehicle 1 is less than or equal to a reference speed. Here, the reference speed may be different according to a type of a road or a traffic condition of the road.

Nearby obstacles may be obstacles positioned adjacent to a following lane line.

When image information of a road is received during the autonomous driving mode, the processor 141 may process an image to identify a lane line of the road, may identify a host vehicle lane in which a host vehicle travels and neighboring lanes based on position information of the identified lane, may generate a following lane line based on lane information and path information for the identified host vehicle lane, and may control autonomous driving based on position information and obstacle information of the generated following lane line.

Such a following lane line is a line through which a center of a vehicle body of a vehicle follows any position of a lane. Here, any position of the lane may be a position of any one of two lane lines constituting a lane or a central position of the two lane lines.

When lateral avoidance is performed based on generated position information of an avoidance lane line, the processor 141 may determine a possibility of collision with an obstacle, when it is determined that there is a possibility of collision with an obstacle, the processor 141 may determine a risk of collision with the obstacle based on traveling information of a vehicle and motion information of the obstacle, may generate a braking signal based on the determined risk of collision, and may transmit the generated braking signal to a braking system 32.

The processor 141 may also generate a steering signal for avoiding an obstacle and may also control the output of collision warning information.

In response to a possibility of collision with an obstacle, the processor 141 may perform control based on position information of the obstacle and speed information of the obstacle among motion information of the obstacle and acquired traveling speed information of a vehicle such that the vehicle travels while adjusting a traveling speed.

That is, during the autonomous driving mode, the processor 141 controls at least one of braking, accelerating, and steering to allow a vehicle to autonomously travel to a destination.

The processor 141 may control at least one of an engine system 12, the braking system 32, and a steering system 42 based on an acceleration signal, a deceleration signal, and a steering signal.

When a possibility of collision with an obstacle is determined, as an example, the processor 141 may obtain a time-to-collision (TTC), which is a time until collision between the vehicle 1 and a front obstacle, based on position information (relative distance) and speed information (relative speed) of the front obstacle and may determine a possibility of collision with the obstacle based on a comparison result between the obtained TTC and a preset reference time.

When a possibility of collision with an obstacle is determined, as another example, the processor 141 may obtain a distance-to-collision (DTC), which is a distance until collision between the vehicle 1 and a front obstacle, based on speed information (that is, a relative speed) of the front obstacle and may determine a possibility of collision with the obstacle based on a comparison result between the obtained DTC and a distance to the front obstacle.

When it is determined that there is a possibility of collision with an obstacle, the processor 141 may determine a risk of collision based on a TTC and may control the output of warning information for each stage based on the determined risk of collision.

When a command for turning a manual driving mode on is received, based on operation information of a shift lever, steering angle information of the steering wheel, pressure information of a brake pedal, and pressure information of an accelerator pedal which correspond to a user input, the processor 141 may control a traveling speed and a traveling direction of a vehicle and may control stopping of the vehicle.

The processor 141 may perform the AEB mode during the autonomous driving mode or the manual driving mode. The AEB mode may be a default mode and may be turned on or off by a user. Hereinafter, the processor 141 controlling the AEB mode will be described.

During the AEB mode, the processor 141 may detect a nearby obstacle, may determine a possibility of collision with the detected obstacle, when it is determined that there is a possibility of collision, may determine a risk of collision based on traveling information of a vehicle and obstacle information, may control the output of warning information for each stage based on the determined risk of collision, may generate a braking signal for AEB, and may control the output of the generated braking signal.

During the AEB mode, the processor 141 may determine whether a gradient of a road changes, and when it is determined that the gradient of the road changes, the processor 141 may perform control such that a pre-fill time point of AEB is made earlier. That is, during the AEB mode, when it is determined that a vehicle enters a road of which a gradient changes, the processor 141 may perform control such that the pre-fill time point of the AEB is made earlier.

The processor 141 performing the AEB mode will be described in detail with reference to FIGS. 5 to 9.

The processor 141 may receive radar information from the radar module 102 through the communicator 143, may receive pitch angle information from the pitch angle detector 162 through the communicator 143, and may receive image information from the front camera 110 through the communicator 143.

The processor 141 may receive radar information, pitch angle information, and image information transmitted from other systems through the communicator 143. For example, other systems may be an autonomous driving control system, a smart cruise control system, and a vehicle ESC system.

The processor 141 may acquire pitch angle information of the vehicle body based on longitudinal acceleration information detected by the acceleration sensor and a plurality of pieces of wheel speed information detected by the plurality of wheel speed sensors. For example, the processor 141 acquires traveling speed information of the vehicle based on pieces of wheel speed information of front, rear, left, and right wheels detected by the plurality of wheel speed sensors and acquires acceleration information of the vehicle based on the acquired traveling speed information. That is, acceleration information aw of the vehicle may be obtained by differentiating the traveling speed information.

The processor 141 may also acquire pitch angle information of the vehicle body based on longitudinal acceleration information ag detected by the acceleration sensor and the acquired acceleration information aw.

Pitch angle information about a pitch angle of the vehicle body may be obtained through an equation of g×sin θ=ag−aw. Here, g denotes gravity, and θ denotes the pitch angle of the vehicle body.

The pitch angle information of the vehicle body may include a plus or minus value according to a rotation direction based on a horizontal axis of the vehicle body.

The processor 141 may determine whether a gradient of a road changes based on at least one of radar information detected by the radar module 102, pitch angle information detected by the pitch angle detector 162, and image information acquired by the front camera 110 and may control a pre-fill operation according to whether the gradient of the road changes.

When whether the gradient of the road changes is determined, the processor 141 may determine whether the gradient of the road changes into a steep gradient. That is, the processor 141 may determine whether the vehicle enters a steep gradient road.

Figure 5A:
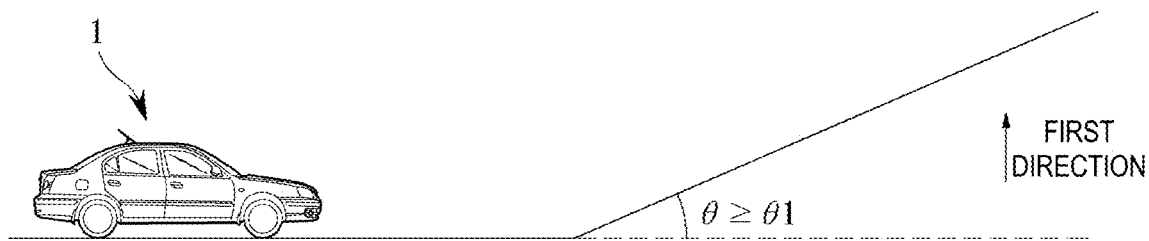
FIGS. 5A and 5B are exemplary diagrams for defining a steep gradient road on which a vehicle travels according to an embodiment.

As shown in FIG. 5A, the processor 141 may determine whether a gradient θ of a road changes to a first reference gradient θ1 or more in a first direction based on a traveling direction of the vehicle, and when it is determined that the gradient θ of the road changes to the first reference gradient θ1 or more in the first direction, the processor 141 may determine that the gradient of the road changes into a steep gradient.

Figure 5B:
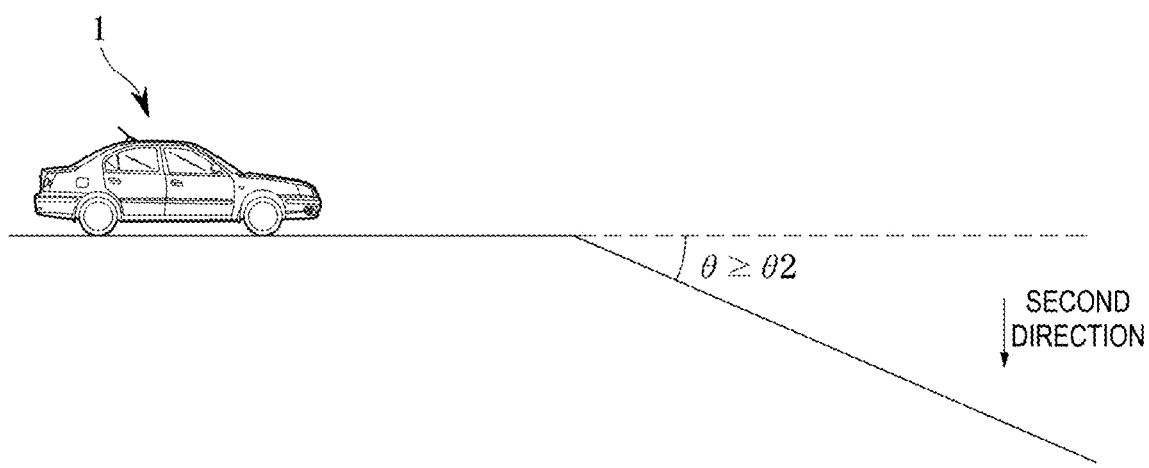

As shown in FIG. 5B, the processor 141 may determine whether a gradient θ of a road changes to a second reference gradient θ2 or more in a second direction based on a traveling direction of the vehicle, and when it is determined that the gradient θ of the road changes to the second reference gradient θ2 or more in the second direction, the processor 141 may determine that the gradient of the road changes into a steep gradient.

Here, the first reference gradient and the second reference gradient may be the same or different.

The processor 141 may determine whether a gradient of a road changes into a steep gradient based on pitch angle information detected by the pitch angle detector 162.

The processor 141 may determine whether positive signal information or negative signal information is included based on the pitch angle information detected by the pitch angle detector 162, when it is determined that the positive signal information is included, the processor 141 may determine whether a pitch angle of the vehicle body is greater than or equal to a first reference pitch angle, and when it is determined that the pitch angle of the vehicle body is greater than or equal to the first reference pitch angle, processor 141 may determine that a gradient of a road changes into a steep gradient.

When it is determined that the pitch angle of the vehicle body is less than the first reference pitch angle, the processor 141 may determine that the gradient of the road is maintained or changed to a gentle gradient.

When it is determined that the minus signal information is included, the processor 141 may determine whether the pitch angle of the vehicle body is greater than or equal to a second reference pitch angle, and when it is determined that the pitch angle of the vehicle body is greater than or equal to the second reference pitch angle, the processor 141 may determine that the gradient of the road changes into the steep gradient.

When it is determined that the pitch angle of the vehicle body is less than the second reference pitch angle, the processor 141 may determine that the gradient of the road is maintained or changed to the gentle gradient.

When it is determined that the positive signal information is included in the pitch angle information, the processor 141 may determine that a road to which a vehicle enters is an uphill road, and when it is determined that the minus signal information is included, the processor 141 may determine that a road to which a vehicle enters is a downhill road.

Based on pitch angle information detected by the pitch angle detector 162, when the pitch angle of the vehicle body increases to the first reference pitch angle or more within a set time or to the second reference pitch angle or more within the set time, the processor 141 may determine that a gradient of a road changes into a steep gradient.

Here, the first reference pitch angle and the second reference pitch angle may be the same or different.

The processor 141 may identify an object of the other vehicle in a front image based on image information of the front camera 110 and may determine whether a gradient of a road changes based on whether the object of the other vehicle is identified. This will be described with reference to FIGS. 6A, 6B, 7A, 7B, 8A, and 8B.

Figure 6A:
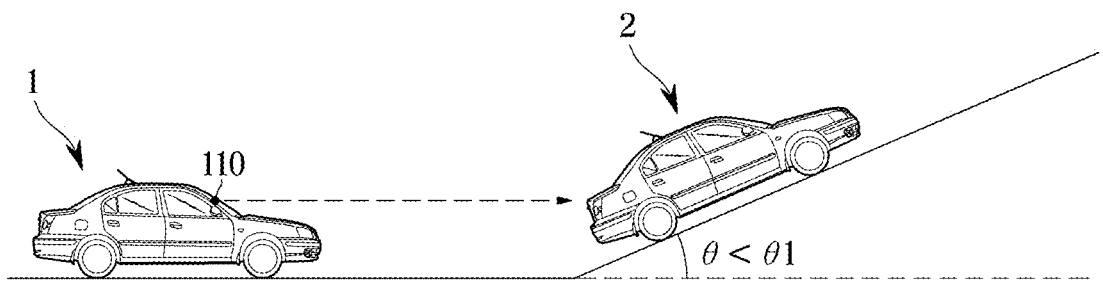
FIGS. 6A and 6B are exemplary diagrams of a gentle gradient front road on which a vehicle is to travel according to an embodiment.

As shown in FIG. 6A, when a gradient θ of a road is less than a first reference gradient θ1 in a first direction, the other vehicle 2 is present within a field of view (FOV) of the front camera 110. That is, when the gradient θ of the road is less than the first reference gradient θ1 in the first direction, the processor 141 may identify an object of the other vehicle from a front image acquired by the front camera 110.

The gradient θ of the road that is less than the first reference gradient θ1 in the first direction means that a gradient of a road is maintained or the road is gradually inclined.

Figure 6B:
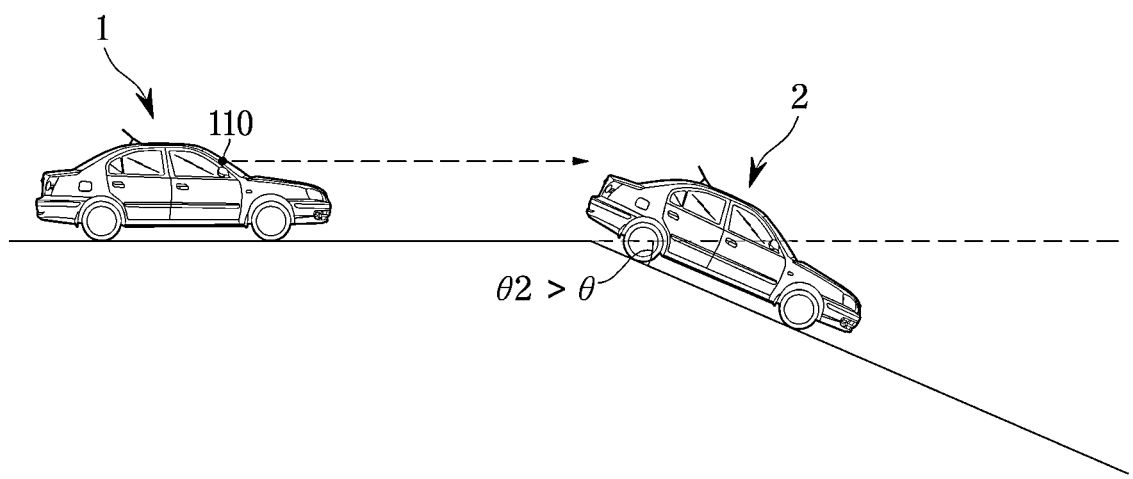

As shown in FIG. 6B, when a gradient θ of a road is less than a second reference gradient θ2 in a second direction, the other vehicle 2 is present within an FOV of the front camera 110. That is, when the gradient θ of the road is less than the second reference gradient θ2 in the second direction, the processor 141 may identify an object corresponding to the other vehicle from a front image acquired by the front camera 110.

The gradient θ of the road that is less than the second reference gradient θ2 in the second direction means that a gradient of a road is maintained or the road is gently inclined.

Figure 7A:
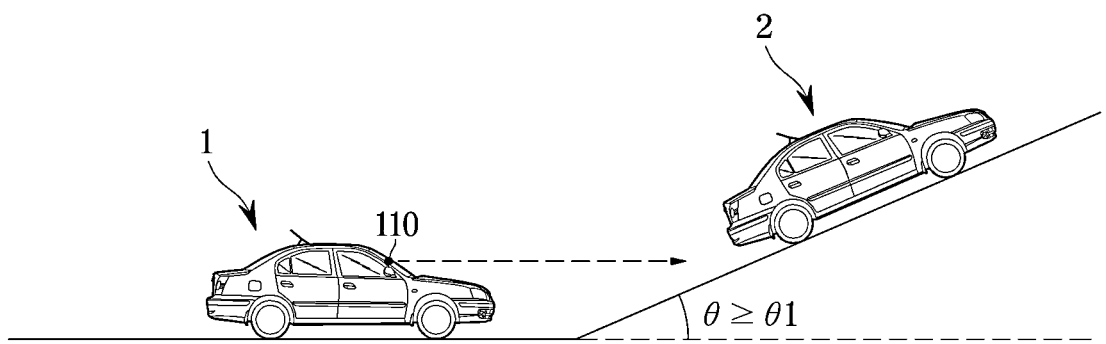
FIGS. 7A, 7B, 8A, and 8B are exemplary diagrams of a steep gradient front road on which a vehicle is to travel according to an embodiment.
Figure 7B:
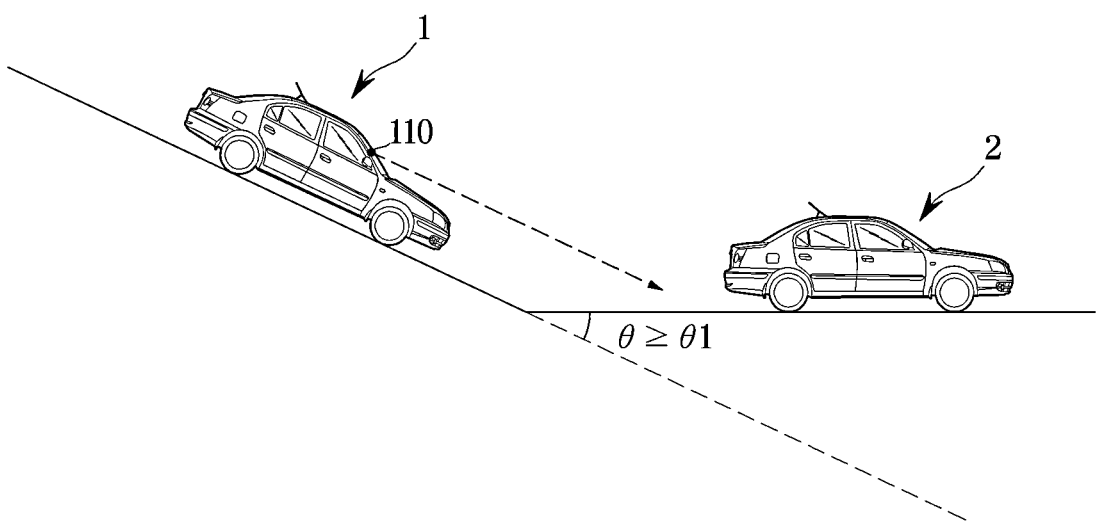

As shown in FIGS. 7A and 7B, when a gradient θ of a road is greater than or equal to a first reference gradient θ1 in a first direction, the other vehicle 2 is present outside an FOV of the front camera 110. That is, when the gradient θ of the road is greater than or equal to the first reference gradient θ1 in the first direction, the processor 141 may identify an object of the other vehicle 2 from a front image acquired by the front camera 110.

Figure 8A:
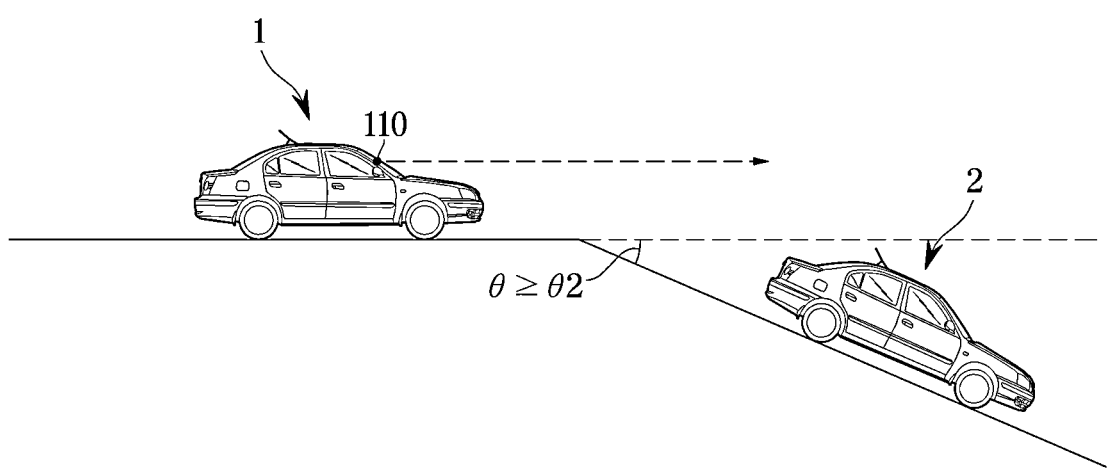
Figure 8B:
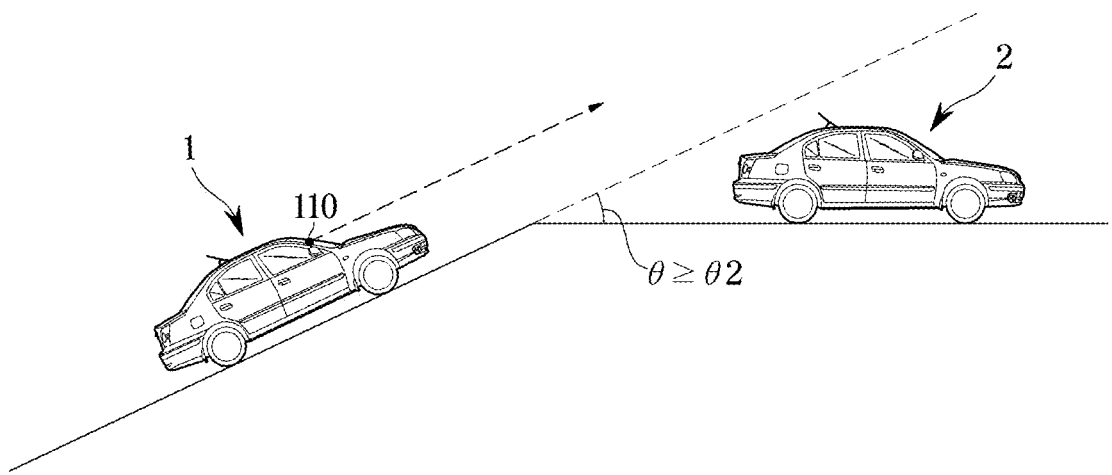

As shown in FIGS. 8A and 8B, when a gradient θ of a road is greater than or equal to a second reference gradient θ2 in a second direction, the other vehicle 2 is present outside an FOV of the front camera 110. That is, when the gradient θ of the road is greater than or equal to the second reference gradient θ2 in the second direction, the processor 141 may identify an object corresponding to the other vehicle 2 from a front image acquired by the front camera 110.

The processor 141 may primarily determine whether an object of the other vehicle is identified in a front image based on image information acquired by the front camera 110, when it is primarily determined that the object of the other vehicle is identified in the front image, the processor 141 may secondarily determine whether the object of the other vehicle is identified in a front image based on image information acquired by the front camera 110 after a preset time elapses, and when it is determined that the object of the other vehicle is not identified in the front image, the processor 141 may determine that a gradient of a road changes into a steep gradient.

That is, when, in a state in which an object of the other vehicle is identified in a front image obtained at a first time point, it is determined that the object of the other vehicle is not identified in a front image acquired at a second time point after a preset time elapses, the processor 141 may determine that a gradient of a road changes into a steep gradient.

When, in a state in which an object of the other vehicle is identified in a front image obtained at a first time point, it is determined that the object of the other vehicle is identified in a front image acquired at a second time point after a preset time elapses, the processor 141 may determine that a gradient of a road is maintained or is gradually changed.

The processor 141 may determine whether a gradient of a road changes based on whether the other vehicle is detected through the front radar 120 and whether an object of the other vehicle is identified through a front image.

The processor 141 may determine whether the other vehicle is present within a reference distance based on radar information of the front radar 120, when it is determined that the other vehicle is present within the reference distance, the processor 141 may determine whether an object of the other vehicle is identified in a front image based on image information acquired by the front camera 110, and when it is determined that the object of the other vehicle is not identified, the processor 141 may determine that a gradient of a road changes into a steep gradient.

When it is determined that the other vehicle is present within the reference distance and the object of the other vehicle is identified in the front image, the processor 141 may determine that the gradient of the road is maintained or is gradually changed.

The processor may determine whether a pitch angle of the vehicle body changes to a reference pitch angle or more based on pitch angle information of the vehicle body, when it is determined that the pitch angle of the vehicle body changes to the reference pitch angle or more, the processor may determine whether there is a change in two images from a state in which the other vehicle is present to a state in which the other vehicle is not present acquired at a preset time interval, and when it is determined that there is a change from a state in which the other vehicle is present to a state in which the other vehicle is not present, that is, a state in which the other vehicle disappears, the processor may determine that a gradient of a front road changes to a reference gradient or more.

When a pitch angle of a vehicle body changes less than a reference pitch angle and the other vehicle is present in two images, the processor may determine that a gradient of a front road changes less than the reference pitch angle.

When it is determined that the pitch angle of the vehicle body changes less than a reference pitch angle and there is a change in two images from a state in which the other vehicle is present to a state in which the other vehicle is not present, that is, a state in which the other vehicle disappears, the processor may determine that the other vehicle increases a traveling speed. That is, the processor may determine that a gradient of a front road changes less than a reference gradient.

When a pitch angle of the vehicle body changes to a reference pitch angle or more and the other vehicle is present in two images, the processor may determine that the vehicle 1 is moving due to an obstacle such as a bump. That is, the processor may determine that a gradient of a front road changes less than a reference gradient.

Figure 9A:
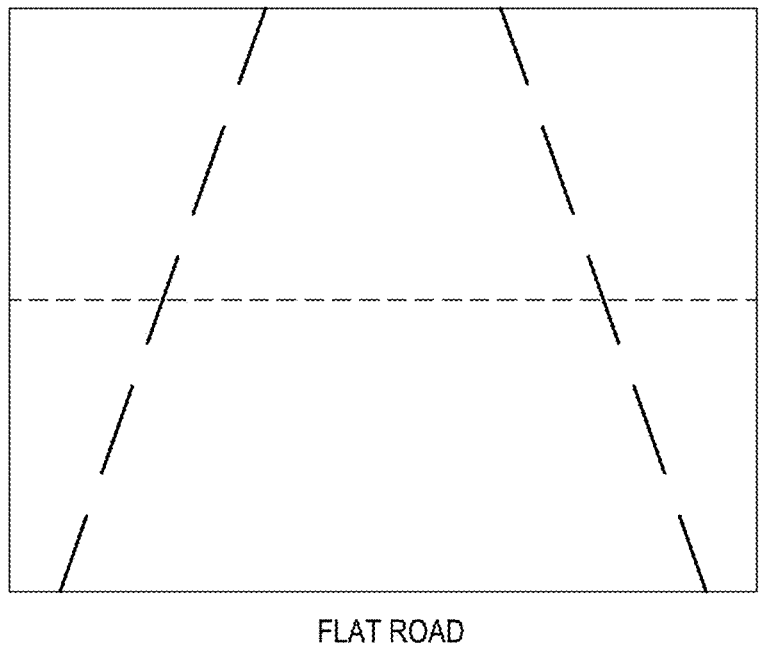
FIGS. 9A, 9B, and 9C are exemplary diagrams of lane lines identified by a camera for each gradient of a front road on which a vehicle is to travel according to an embodiment.

As shown in FIG. 9A, the processor 141 may divide a lane line into a near-field region and a far-field region to identify the lane line based on image information of the front camera 110 and may determine a distortion between the near-field region and the far-field region of the identified lane line, and when it is determined that the distortion of the identified lane line is less than a reference distortion, the processor 141 may determine that a gradient of a road is maintained or is gradually changed.

Figure 9B:
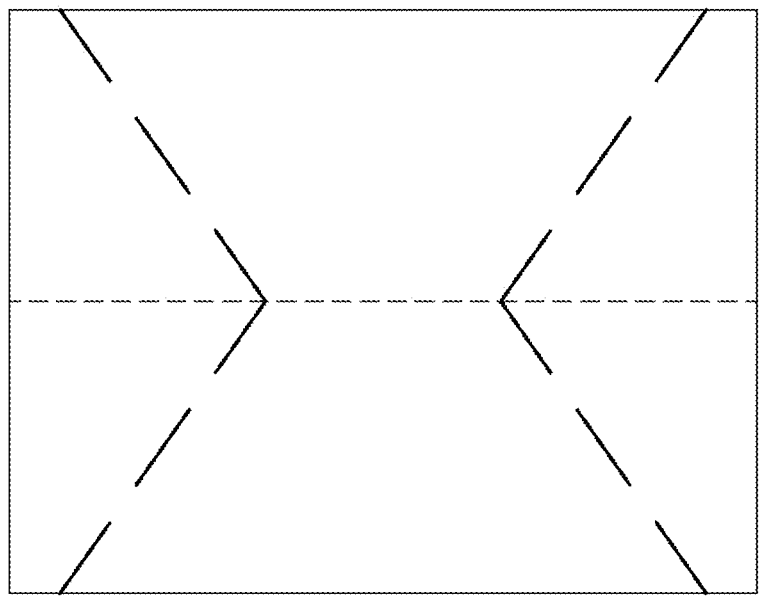
Figure 9C:
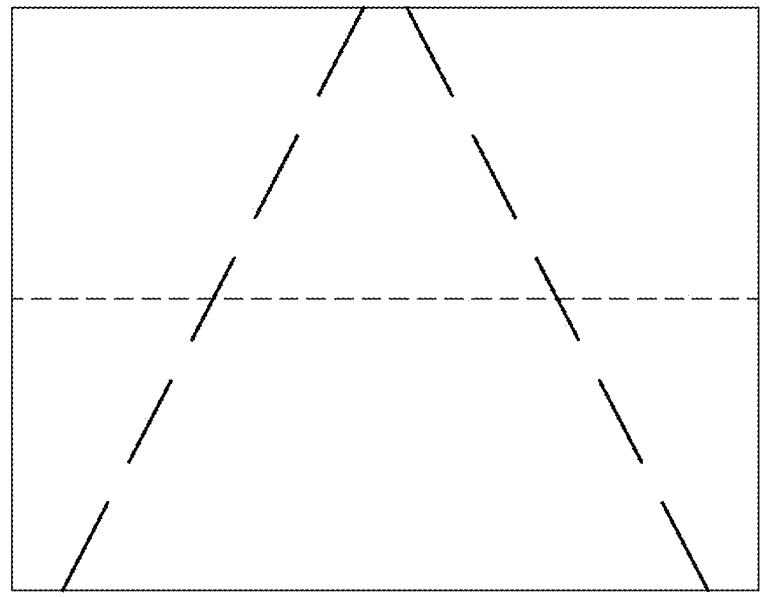

As shown in FIGS. 9B and 9C, when it is determined that a distortion of a identified lane line is greater than or equal to a reference distortion, the processor 141 may determine that a gradient of a road changes into a steep gradient.

The processor 141 may determine the need for AEB based on a TTC and whether a gradient of a road changes.

Figure 10:
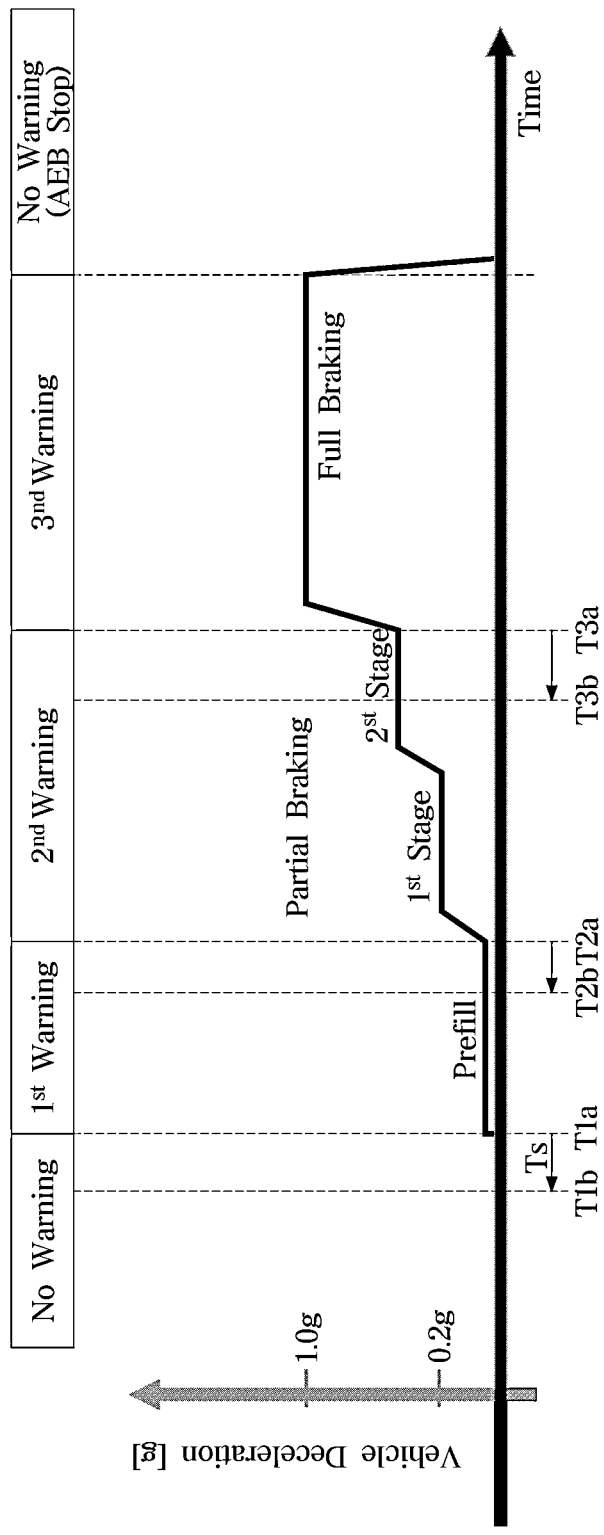
FIG. 10 is an exemplary diagram of a braking stage of a vehicle according to an embodiment.

As shown in FIG. 10, when it is determined that a gradient of a road is maintained or is gradually changed, the processor 141 may obtain a TTC, which is a time until collision between the vehicle 1 and the other vehicle, based on position information (relative distance) and speed information (relative speed) of the other vehicle, may obtain a pre-fill operation time point T1a, a partial braking operation time point T2a, and a full braking operation time point T3a based on the obtained TTC, may generate and output a pre-fill control signal at the obtained pre-fill operation time point, may generate and output a partial braking control signal at the partial braking operation time point, and may generate and output a full braking control signal at the full braking operation time point.

The processor 141 may control the output of warning information for each stage based on the pre-fill operation time point, the partial braking operation time point, and the full braking operation time point.

The processor 141 may transmit warning information for each stage to the display 152 and the sound output unit 153.

When obtaining a partial braking operation time point, the processor 141 may control partial braking of a first stage and partial braking of a second stage based on an obtained TTC.

Pre-fill is to enter a braking preparation state for emergency braking and generates a preset braking force. Generating a preset braking force is to cause a vehicle to travel at a preset deceleration.

The partial braking of the first stage is to generate a braking force corresponding to a first ratio of full braking (braking force of 100%), and the partial braking of the second stage is to generate a braking force corresponding to a second ratio of the full braking (braking force of 100%).

Here, the second ratio is higher than the first ratio.

The processor 141 may control a pre-fill operation at the pre-fill operation time point, may control partial braking at the partial braking operation time point, and may control full braking at the full braking operation time operation.

The processor 141 may determine whether a gradient of a road changes into a steep gradient, and when it is determined that the gradient of the road changes into the steep gradient, the processor 141 may generate and output a pre-fill control signal.

As such, according to the present embodiment, since a pre-fill operation is performed in advance at a time point at which a vehicle enters a steep gradient road, the other vehicle is identified after the vehicle enters the steep gradient road, thereby making the partial braking operation time point T2a and the full braking operation time point T3a earlier.

Therefore, according to the present embodiment, since a pre-fill operation is performed in advance at a time point at which a vehicle enters a steep gradient road, after the vehicle enters the steep gradient road, it is possible to prevent a collision with the other vehicle that has not been identified.

The processor 141 may acquire position information (relative distance) and speed information (relative speed) of a front vehicle based on radar information detected by the front radar 120 after a vehicle enters a steep gradient road, may obtain a TTC based on position information (relative distance) and speed information (relative speed) of the other vehicle, and may generate and output a release signal of a pre-fill operation when the obtained TTC is greater than or equal to a preset reference time.

When the obtained TTC is less than the preset reference time, the processor 141 may generate and output a partial braking control signal and a full braking control signal based on the obtained TTC.

When the other vehicle in front is detected by the front radar 120 and it is determined that a gradient of a road changes into a steep gradient, the processor 141 may obtain a TTC based on position information (relative distance) and speed information (relative speed) of the other vehicle, may obtain the pre-fill operation time point T1a based on the obtained TTC, may reobtain a pre-fill operation time point based on the obtained pre-fill operation time point T1a and a preset time Ts, and may also generate and output a pre-fill control signal based on the reobtained pre-fill operation time point T1b.

When the pre-fill operation time point is reobtained, the processor 141 may generate a pre-fill control signal at a time point that is earlier than the obtained pre-fill operation time point by the preset time.

The processor 141 may be implemented as one processor.

The processor 141 may include a memory (not shown) which stores an algorithm for executing the operation of the DAS 100 or a data for a program reproducing the algorithm and a processor which performs the above-described operation using data stored in the memory.

The processor 141 may include a memory (not shown) which stores an algorithm for controlling the operation of the components in the vehicle 1 or data for a program reproducing the algorithm and a processor which performs the above-described operation using data stored in the memory. In this case, the memory and the processor may each be implemented as a separate chip. Alternatively, the memory and the processor may each be implemented as a single chip.

The memory 142 may store programs and/or data for processing image data by the processor 141, programs and/or data for processing radar data by the processor 141, and programs and/or data for generating an acceleration signal, a braking signal, and/or a steering signal by the processor 141.

The memory 142 may temporarily store image data received from the front camera 110 and/or radar data received from the radars 120 and 130 and may temporarily store processing results of image data and/or radar data by the processor 141.

The memory 142 and the processor 141 may each be implemented as a separate chip. Alternatively, the memory 142 and the processor 141 may each be implemented as a single chip.

The memory 142 may store information about a preset time.

The memory 142 stores information about a first reference pitch angle and a second reference pitch angle.

The memory 142 may store information about a type, volume level, and output period of a sound corresponding to warning information for each stage.

The memory 142 may store information about a reference distance and reference time for determining a possibility of collision.

The memory 142 may also store braking force information or deceleration information corresponding to pre-fill, partial braking, and full braking.

The memory 142 may be implemented as at least one of non-volatile memories such as a cache, a ROM, a programmable ROM (PROM), an EPROM, an electrically erasable programmable ROM (EEPROM), and flash memory, a volatile memory such as a random access memory (RAM), and storage media such as a hard disk drive (HDD) and CD-ROM, but the present disclosure is not limited thereto.

According to the present disclosure, a change in gradient of a road is determined based on at least one of camera image information and traveling state information, and a pre-fill operation of an AEB device according to the change in gradient of the road, thereby making operation time points of partial braking and full braking earlier (second or third stage of AEB). Thus, according to the present disclosure, it is possible to reduce a risk of collision with an obstacle. That is, according to the present disclosure, it is possible to reduce a risk of collision with an obstacle when a vehicle enters a steep uphill or downhill road.

According to the present disclosure, it is possible to improve autonomous driving performance and stability during autonomous driving.

According to the present disclosure, it is possible to quickly and safely avoid nearby obstacles in a state in which a hardware component is not added, thereby preventing a rise in costs of a vehicle and also improving the utilization of a DAS.

In this way, according to the present disclosure, it is possible to improve the quality and marketability of a DAS and a vehicle including the DAS, and furthermore, it is possible to increase user satisfaction and secure product competitiveness.

Meanwhile, the disclosed embodiments can be implemented with recording media for storing computer-executable instructions. The instructions can be stored in the form of program code and generate, when executed by a processor, a program module such that the operations of the disclosed embodiments can be performed. The recording media can be implemented as computer-readable recording media.

The computer-readable recording media include all types of recording media in which instructions that can be interpreted by a computer are stored. Examples of the computer-readable recording media include a ROM, a RAM, a magnetic tape, a magnetic disk, a flash memory, an optical data storage device, and the like.

The disclosed embodiments have been described above with reference to the accompanying drawings. Those of ordinary skill in the art to which the present disclosure pertains will appreciate that the present disclosure can be carried out in forms different from the disclosed embodiments without changing the technical spirit or essential characteristics of the present disclosure. The disclosed embodiments are exemplary and should not be interpreted as restrictive.

What is claimed is:

1. A system comprising:
a camera; and
a processor configured to:
identify at least one of other vehicle and a lane line in an image based on image information acquired by the camera,
determine whether a gradient of a front road for a vehicle to be entered changes to a reference gradient or more, based on at least one of whether the other vehicle is present and whether the lane line is distorted, and
control a pre-fill operation based on determining that the gradient of the front road changes to the reference gradient or more.

2. The system of claim 1, further comprising an obstacle detector configured to detect an obstacle and output obstacle information about the detected obstacle,
wherein the processor is configured to:
obtain a time-to-collision with respect to the other vehicle based on the obstacle information upon determining that the gradient of the front road changes less than the reference gradient, and
control the pre-fill operation based on the obtained time-to-collision.

3. The system of claim 1, further comprising a communicator,
wherein the processor is configured to determine whether the gradient of the front road changes to the reference gradient or more based on pitch angle information of a vehicle body received through the communicator.

4. The system of claim 1, wherein the processor is configured to:
determine a distortion of the lane line based on identifying the lane line in the image; and
determine that the gradient of the front road changes to the reference gradient or more based on determining a distortion of the lane line being greater than or equal to a reference distortion.

5. The system of claim 1, wherein the processor is configured to:
determine whether the other vehicle is present on other image information acquired after a preset time elapses based on determining that the other vehicle is present in the image; and
determine that the gradient of the front road changes to the reference gradient or more based on determining that no other vehicle is not present in the image.

6. The system of claim 5, further comprising an obstacle detector configured to detect an obstacle and output obstacle information about the detected obstacle,
wherein the processor is configured to:
determine that the gradient of the front road changes less than the reference gradient based on determining that the other vehicle is present on other image information acquired after a preset time elapses,
obtain a time-to-collision with respect to the other vehicle based on the obstacle information, and
control the pre-fill operation based on the obtained time-to-collision.

7. The system of claim 1, further comprising an obstacle detector configured to detect an obstacle and output obstacle information about the detected obstacle,
wherein the processor is configured to:
determine whether the other vehicle is detected by the obstacle detector;
determine whether the other vehicle is present in the image based on determining that the other vehicle is detected by the obstacle detector; and
determine that the gradient of the front road changes to the reference gradient or more based on determining that the other vehicle is not present in the image.

8. The system of claim 7, wherein the processor is configure to obtain a time-to-collision with respect to the other vehicle based on the obstacle information upon determining that the other vehicle is detected by the obstacle detector and the other vehicle is present in the image, and control the pre-fill operation based on the obtained time-to-collision.

9. A system comprising:
a communicator;
a camera; and
a processor configured to:
determine whether other vehicle is present in an image based on image information acquired by the camera,
determine whether a gradient of a front road changes to a reference gradient or more based on pitch angle information of a vehicle body received through the communicator upon determining whether the other vehicle is present in the image, and
control a pre-fill operation based on determining that the gradient of the front road changes to the reference gradient or more.

10. The system of claim 9, further comprising an obstacle detector configured to detect an obstacle and output obstacle information about the detected obstacle,
wherein the processor is configured to:
obtain a time-to-collision with respect to the other vehicle based on the obstacle information upon determining that the gradient of the front road changes less than the reference gradient, and
control the pre-fill operation based on the obtained time-to-collision.

11. The system of claim 9, wherein the processor is configured to determine that the gradient of the front road changes to the reference gradient or more based on determining that a pitch angle of the vehicle body changes to a reference pitch angle or more based on the pitch angle information of the vehicle body and there is a change from a state in which the other vehicle is present to a state in which the other vehicle is not present in two images acquired with a preset time interval.

12. The system of claim 11, further comprising an obstacle detector configured to detect an obstacle and output obstacle information about the detected obstacle,
wherein the processor is configured to:
determine that the gradient of the front road changes less than the reference gradient based on determining that the pitch angle of the vehicle body is less than the reference pitch angle or the other vehicle is present in the two images, the processor,
obtain a time-to-collision with respect to the other vehicle based on the obstacle information, and
control the pre-fill operation based on the obtained time-to-collision.

13. The system of claim 9, further comprising an obstacle detector configured to detect an obstacle and output obstacle information about the detected obstacle,
wherein the processor is configure to:
obtain a time-to-collision with respect to the other vehicle based on the obstacle detection information after a vehicle enters the front road and
control the pre-fill operation to be released based on the obtained time-to-collision.

14. A vehicle comprising:
an obstacle detector configured to detect an obstacle and output obstacle information about the detected obstacle;
a pitch angle detector configured to detect a pitch angle of a vehicle body;
a camera; and
a processor configured to:
determine whether the other vehicle is present in an image based on image information acquired by the camera,
determine whether a gradient of a front road changes to a reference gradient or more based on the obstacle information and pitch angle information of the vehicle body upon determining that the other vehicle is present in the image, and
control a pre-fill operation based on determining that the gradient of the front road changes to the reference gradient or more.

15. The vehicle of claim 14, wherein the processor is configured to:
obtain a time-to-collision with respect to the other vehicle based on the obstacle information upon determining that the gradient of the front road changes less than the reference gradient, and
control the pre-fill operation based on the obtained time-to-collision.

16. The vehicle of claim 14, wherein the processor is configured to determine that the gradient of the front road changes to the reference gradient or more based on determining that the pitch angle of the vehicle body changes to a reference pitch angle or more based on the pitch angle information of the vehicle body and there is a change from a state in which the other vehicle is present to a state in which the other vehicle is not present in two images acquired with a preset time interval.

17. The vehicle of claim 16, wherein the processor is configured to:
determine that the gradient of the front road changes less than the reference gradient based on determining that the pitch angle of the vehicle body is less than the reference pitch angle or the other vehicle is present in the two images,
obtain a time-to-collision with respect to the other vehicle based on the obstacle information, and
control the pre-fill operation based on the obtained time-to-collision.

18. The vehicle of claim 14, wherein the processor is configured to:
obtain a time-to-collision with respect to the other vehicle based on obstacle detection information after a vehicle enters the front road, and
control the pre-fill operation to be released based on the obtained time-to-collision.

19. The vehicle of claim 14, wherein the processor is configured to:
determine a distortion of the lane line based on a lane line being identified in the image; and
determine that the gradient of the front road changes to the reference gradient or more based on determining a distortion of the lane line being greater than or equal to a reference distortion.

20. The vehicle of claim 14, wherein the processor is configured to determine that the gradient of the front road changes to the reference gradient or more based on determining that the other vehicle is detected by the obstacle detector and the other vehicle is not present in the image.

* * * * *